United States Patent [19]

Seufert et al.

[11] Patent Number: 4,541,113
[45] Date of Patent: Sep. 10, 1985

[54] APPARATUS AND METHOD OF LINE PATTERN ANALYSIS

[76] Inventors: Wolf D. Seufert, R.R. 5, Sherbrooke, Québec, Canada, J1H 5H3; Roger A. Coté, 1229, rue Joques, Sherbrooke, Québec, Canada, J1H 2Y2

[21] Appl. No.: 459,144

[22] Filed: Jan. 19, 1983

[51] Int. Cl.$^3$ .............................................. G06K 9/00
[52] U.S. Cl. ..................................... 382/4; 356/374; 250/237 G
[58] Field of Search ............... 382/2, 4, 5; 356/71, 356/374; 250/237 G; 350/162.13, 162.14, 162.17, 162.19, 162.20, 162.11

[56] References Cited

U.S. PATENT DOCUMENTS

| | | | |
|---|---|---|---|
| 3,419,287 | 12/1968 | Rudie | 382/4 |
| 3,582,889 | 6/1971 | Bodez | 382/5 |
| 3,584,958 | 6/1971 | Miller | 382/4 |
| 3,771,129 | 11/1973 | McMahon | 382/4 |
| 3,859,633 | 1/1975 | Ho et al. | 382/5 |
| 3,893,080 | 7/1975 | Ho et al. | 382/5 |
| 4,015,240 | 3/1977 | Swonger et al. | 382/5 |
| 4,025,898 | 5/1977 | Shaw | 382/4 |
| 4,149,183 | 4/1979 | Pellar et al. | 358/283 |

OTHER PUBLICATIONS

D. Montgomery, Fingerprint Classification Data, Mar. 1966, IBM Technical Disclosure Bulletin, vol. 8, No. 10, pp. 1356–1357.

Primary Examiner—Leo H. Boudreau
Assistant Examiner—Michael Murray
Attorney, Agent, or Firm—Cushman, Darby & Cushman

[57] ABSTRACT

The disclosure herein describes an apparatus and a method of analysis of line patterns such as fingerprints, ideograms, or the like, which comprises the steps of superimposing a centrosymmetric reference pattern of lines over the line pattern to be analyzed to form an interferometric pattern of the moiré type, positioning the reference pattern on a characteristic element of the line pattern to be analyzed, and enlarging it until the lines of the reference pattern fill the space between adjacent lines closest to the characteristic element to thereby translate the superimposed line patterns into a field pattern of different optical densities.

18 Claims, 11 Drawing Figures

APPARATUS AND METHOD OF LINE PATTERN ANALYSIS

FIELD OF THE INVENTION

The present invention relates to the analysis of line patterns such as fingerprints, ideograms, or similar patterns.

BACKGROUND OF THE INVENTION

The analysis of fingerprints, for example, has become the standard method for the positive identification of individuals because of the immense variety of epidermal ridge patterns which, to date, have not been found to repeat themselves, and also because of the invariance of the individual patterns. They do not change with age; the ridges will evolve again as they were before even after an abrasion of the fingertips' epidermis.

The methods of fingerprint pattern analysis are used principally in criminal investigations but also in medicine, genetics, and anthropology, in much the same way as they were introduced by Francis Galton and Edward Henry before the turn of the century. The possibility to analyse and compare fingerprints automatically has been the subject of intense study for the past 25 years with the objectives, firstly, to devise an instrument that could cope with the ever increasing volume of information in police work, and secondly, to reduce the element of bias associated with a subjective interpretation. Lately, it has been realized that the individuality of fingerprints could be the basis for access control systems if an instrument or apparatus were designed that could give a go/no go decision automatically, within a very brief interval after an access request by presentation of a fingerprint, and necessarily within very strict confidence limits of performance.

Fingerprints are classified by assigning a letter or number code to each characteristic element or pattern observed (e.g., 'T' for the tented arch, 'R' for the radial loop, 'W' for the whorl, etc.). The topological constraints on continuous line patterns containing loops or whorls require that triradii exist, i.e., star-like forms where a ridge branches into two. An important element in establishing the fingerprint code is the number of ridges between a triradius and the center of the whorl or loop. The final identification formula for an individual's set of fingerprints is given as a sequence of the code letters and numbers for all ten fingers.

The conventional system of fingerprint analysis is slow and expensive since it requires highly trained personnel. As a result, analyses are performed in specialized centers only, and the consequence is an inevitable delay in the decisions rendered on the basis of fingerprint comparisons. Still more time-consuming is a search to find a fingerprint on file to match the imprint of a single finger. However, situations in which a presumed criminal has to be identified on the basis of a single print arise very frequently.

The relatively slow process of compiling and emitting data has spurred the development of computers that could, (a), recognize fingerprints on the basis of a comparison with a register of patterns stored in a memory bank, (b), measure them with a high degree of precision, (c), produce the conventional code, and (d), search their files for a matching print. Computers performing these tasks are available; opto-electric scanners look first for the location of the principal or determinant pattern in a print and, once found, proceed by measuring methodically the line slopes in these patterns as well as other features necessary to establish the code. Another class of computers uses a direct optical comparison and correlation. Neither of the systems has proved reliable in daily use. A certain data reduction in either approach is inevitable and might have been the cause for the unacceptably high 'false reject' as also 'false accept' rates. Some companies that have produced computer analysis systems for fingerprints have now ceased the production of these specialized and highly complicated machines.

The difficulties encountered with automated pattern analysis systems for fingerprints probably derive from the fact that the approach adopted tries to simulate too closely the integrating operations of the human eye and brain.

In U.S. Pat. No. 4,025,898 issued May 24, 1977 to Shaw, there is described a method for recording representations of disrupted space patterns, such as fingerprints, so that their classification, comparison and retrieving are simplified. The method makes use of the phenomenon of moiré patterns which consists in the superposition or interference of two periodic structures resulting in an optical image having frequency phase differences. Since fingerprints are a periodic line pattern, another periodic structure is then only required to create the moiré pattern. Hence, in the above patent, moiré interference patterns are created by superimposing a line pattern on a fingerprint, or a print on its own image. When the original and the reference patterns are rotated with respect to each other, the changing interferometric pattern is recorded by a camera: the sequence of lines passing by the camera as well as the variation of amplitude with time of the light signal reflected from, or transmitted through the two superposed patterns expresses the characteristics of the fingerprint. The variation of the moiré pattern is recorded.

OBJECTS AND STATEMENT OF THE INVENTION

It is therefore an object of the present invention to provide a method in which the line pattern in a fingerprint for example is translated into a field pattern of different optical densities. By this method, fingerprints as well as other complex patterns are very easily expressed in recordable forms such as digital code. None of the information contained in the pattern is lost or falsified in the process. Furthermore, the present method gives the correct topological description of the pattern thus extending the present invention to even the most complex problems of pattern recognition.

Contrary to the system described in the above patent, the present invention is concerned with recording a definite interferometric pattern of optical densities resulting from one only possible superposition of ridge pattern and reference pattern.

The present invention therefore relates to a method of analysis of line patterns such as fingerprints, ideograms or like patterns which comprises the steps of: superimposing a centrosymmetric reference pattern of lines over the line pattern to be analyzed to form an interferometric pattern of the moiré type; positioning the reference pattern on a characteristic element of the line pattern to be analyzed, and enlarging it until the lines of the reference pattern fill the space between adjacent lines closest to the characteristic element to thereby translate the superimposed patterns of lines into a field pattern of different optical densities.

In one preferred form of the invention, these optical densities are electronically scanned and measured and the information obtained is stored for subsequent comparison and recognition.

The present invention is also concerned with an apparatus for carrying out this method.

In accordance with the present invention, the intricate line pattern in the case of a fingerprint is expressed in a field pattern of optical densities. All individual characteristics contained in the fingerprint are faithfully reproduced, if in a different form. Since no data reduction is involved, the present method is better suited for the analysis of complex patterns than are computer treatments that search for, and describe mathematically, only the central characteristic element in an imprint while suppressing systematically all other features during the search. With the method given, none of the information contained in the pattern of ridges is lost.

The scope of applicability of the present invention will become apparent from the detailed descripttion given hereinafter; it should be understood however, that this description while indicating preferred embodiments of the invention is given by way of illustration only since various changes and modifications within the spirit and scope of the invention will become apparent to those skilled in the art.

IN THE DRAWINGS

FIGS. 1(a) and 1(b) illustrate the superimposition of a reference pattern over two fingerprints;

FIGS. 2(a), 2(b) and 2(c) are examples of the centering procedure of a reference pattern over lines of a pattern to be analysed;

FIGS. 3(a), 3(b), 3(c) and 3(d) illustrate various types of epidermal ridge patterns in fingerprints giving moiré interferograms;

FIG. 4 shows schematically the use of an electronically defined orthogonal grid over a moiré interferogram; and FIG. 5 represents a logic control system to carry out the method of the present invention.

DESCRIPTION OF PREFERRED EMBODIMENTS

Figure 1A:
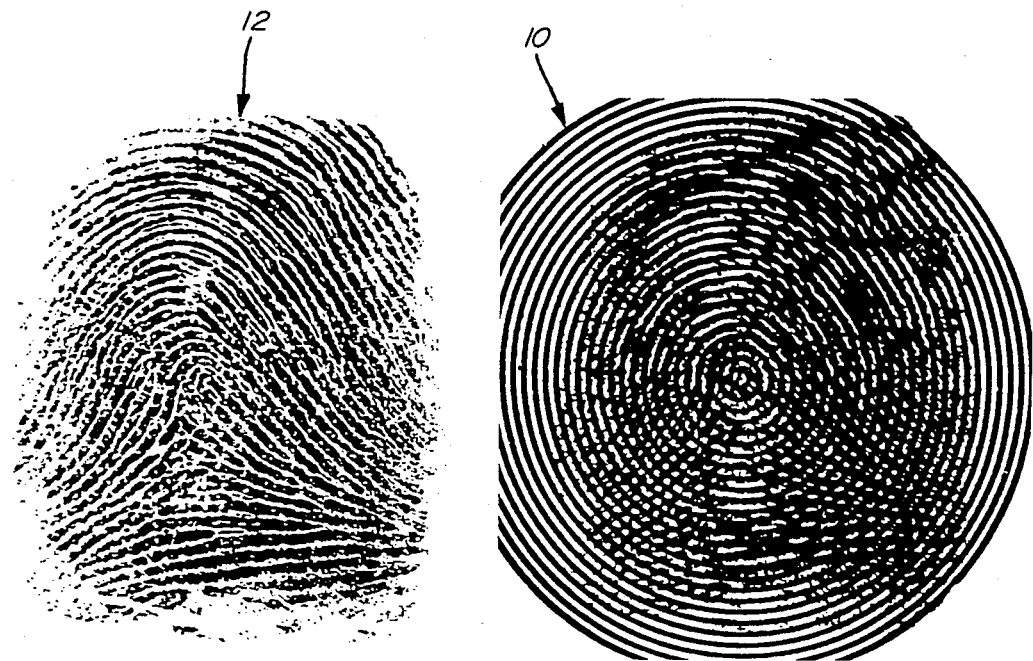
Figure 1B:
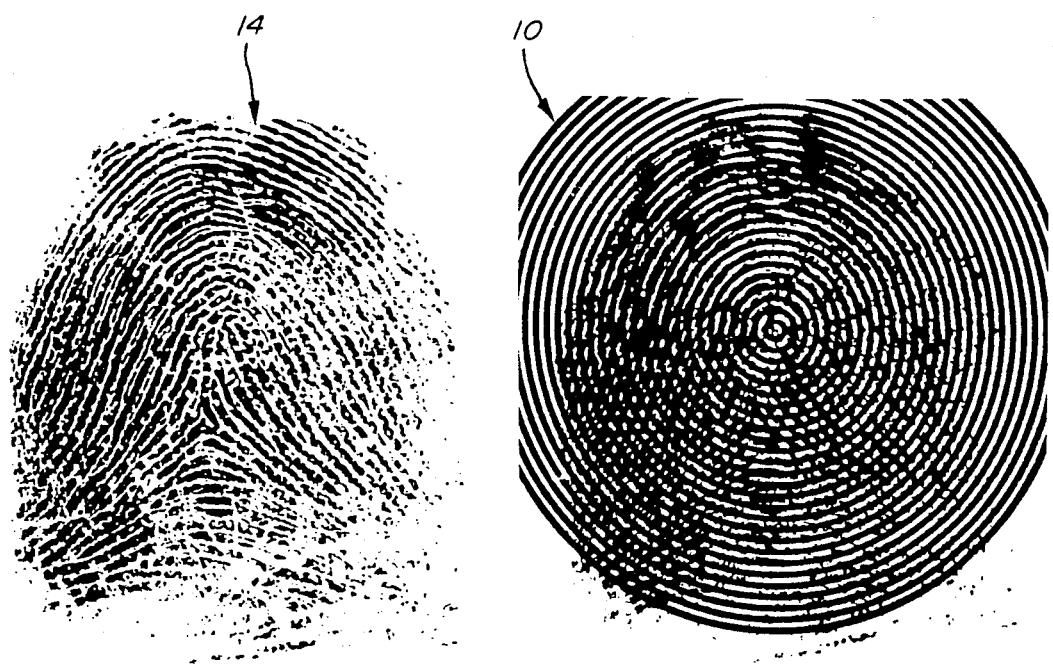

Referring to FIGS. 1(a) and 1(b) a transparent screen 10 of circular centrosymmetric lines (i.e., the reference pattern) is placed over fingerprint images 12 and 14. By this superposition, two distinct interferometric patterns of the moiré type are formed as shown on the right of these figures. It can be seen that the impressions from epidermal ridges running parallel to the lines on the circular screen are emphasized; those intercepting the lines at greater angles are far less conspicuous. Moiré interferograms produced in this way express the individual variations of the imprints since the superposition step is the equivalent of multiplying, by a common factor, each element in the picture to be analysed.

The lines forming this centrosymmetric reference pattern have the same periodicity throughout and are of equal thickness. The reference pattern is centered on the imprints' characteristic element (an arch, loop or whorl).

Figure 2A:
Figure 2B:
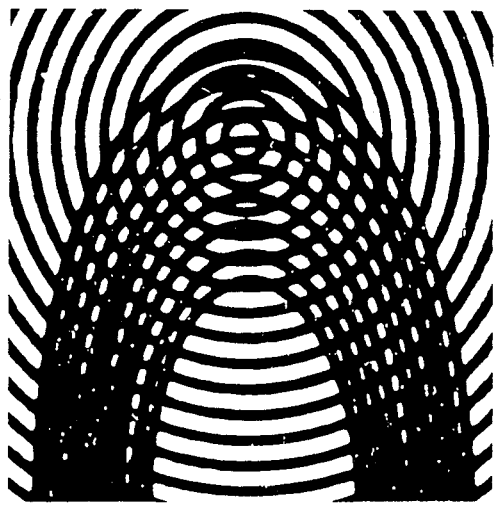
Figure 2C:

A unique and characteristic interferogram between reference pattern and fingerprint is obtained in the following two steps:

(a) the centrosymmetric reference pattern is enlarged until the width of its lines equals the distance between the ridges in the fingerprint;

(b) the reference pattern is then displaced over the fingerprint until its center or the line closest to its center corresponds, in its curvature, to that of an interridge space. Thus the ridges and the reference lines running parallel form fields of equal density, distinct from areas where lines intercept at greater angles: with this, the pattern of lines is translated into a field pattern. The correct procedure for centering is demonstrated schematically in FIGS. 2(a), 2(b) and 2(c). FIG. 2(a) shows a reference pattern superimposed arbitrarily on a set of arches representing the characteristic element in a fingerprint. FIG. 2(b) shows the reference pattern being correctly positioned on the vertical axis only while FIG. 2(c) shows the correct superposition. Hence, the greatest optical density of interference pattern is directly above the center of the reference pattern and extends over the longest horizontal distance possible.

Figure 3A:
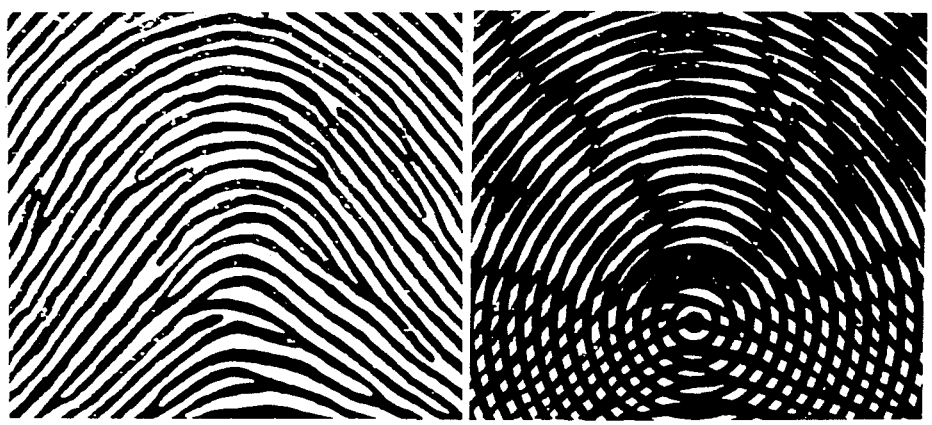
Figure 3B:
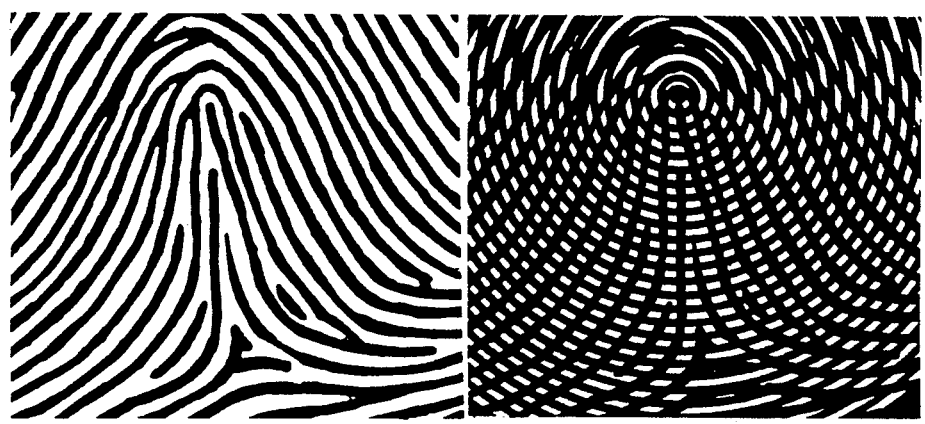
Figure 3C:
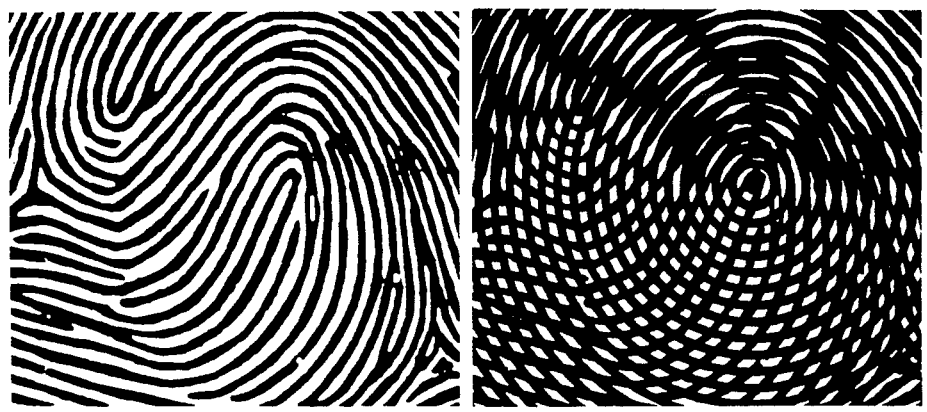
Figure 3D:
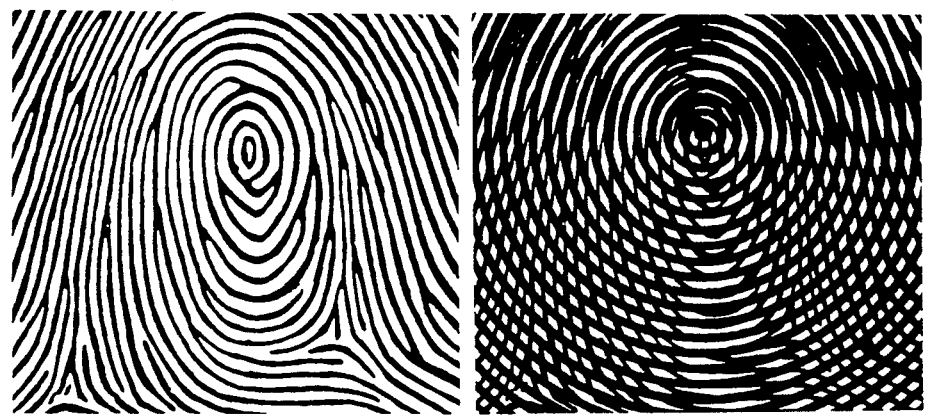

Different types of epidermal ridge patterns in a fingerprint are shown in FIGS. 3(a) for an arch, 3(b) for a tented arch, 3(c) for a loop and 3(d) for a whorl. In the case of a double loop as illustrated in FIG. 3(c) where two figures of approximately equal prominence are present, the reference pattern is centered on the lower one.

Figure 4:
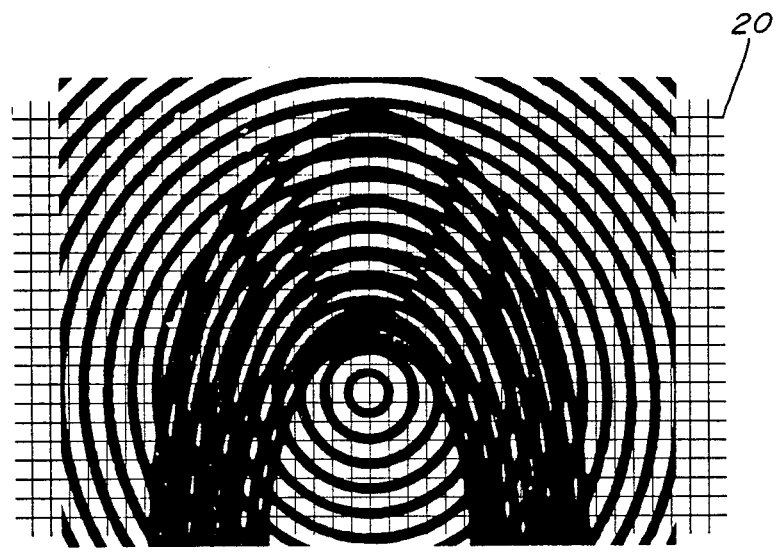

In accordance with the present invention, the intricate line pattern of a fingerprint is expressed in a field pattern of optical densities. The optical density differences can be read with conventional 'flying spot' scanners over an electronically defined grid (FIG. 4); these devices are extremely fast and, with this, the collection of data that constitutes the time-limiting factor in pattern recognition is considerably accelerated. Once digitized, the data are rapidly processed by standard computer techniques. Although the processing speed will increase, the possibility of processing errors will be reduced because of the simplicity of the method.

Figure 5:
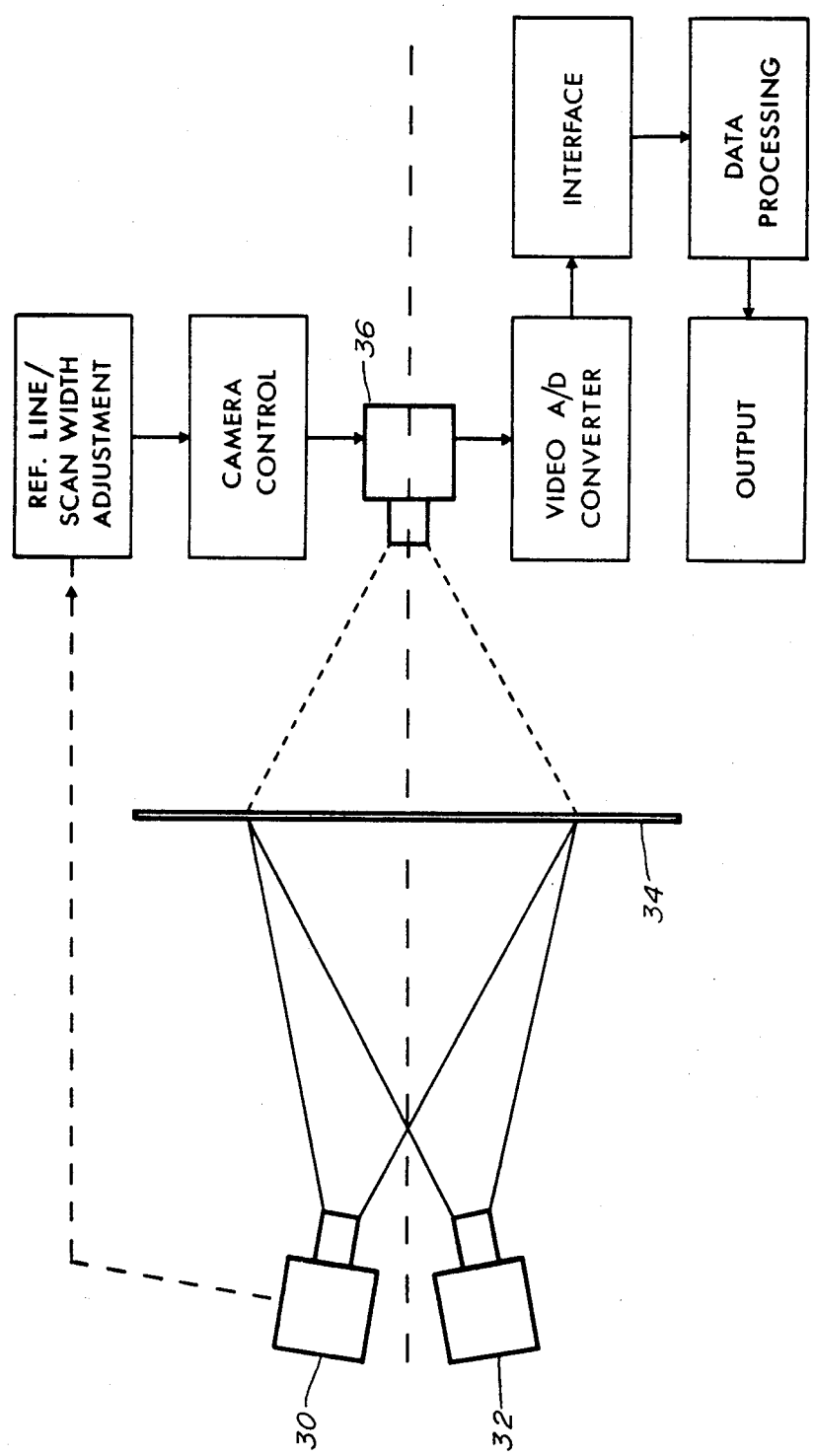

Referring to FIG. 5, there is shown a simple apparatus to measure and analyse fingerprints by interferometry. The apparatus includes a first projector 30 for the reference pattern, a fingerprint projector 32, a matte-finished glass screen 34 and a 'flying spot' scanning camera 36.

The analysis of a single print gives a string or sequence of digits, e.g. in binary code, of which any length can be compared by computer with a sequence of digits on file. In this way, even partial prints are matched automatically, always provided that the central feature is available for the correct positioning of the reference pattern. The probability of finding a matching print grows in direct proportion to the length of the string of digits available, and the opto-electronic reader should therefore scan the moiré interferograms in both directions, i.e., it should read consecutive lines of the grid end-to-end (palindromic scan). Since the grid will extend beyond the image to be analysed, the computer is programmed to delete any sequence repeating bit '0' more than n (user-defined) times. The threshold at which the opto-electronic device responds with 'on' or '1' is to be given by the proportion to which each of the cells scanned is filled with the pattern. No signal (or '0', or 'off') will be recorded if the cell is traversed only by either, (a) one line of the reference pattern, (b), the imprint of one ridge, or (c), by a combination of the two which does not fill the cell sufficiently. A cell will be filled completely whenever a line in the reference pattern and in the imprint run parallel. Faults in the recorded imprint, for instance because of incomplete inking, will be eliminated by setting the response threshold of the opto-electronic scanner in such a way that it signals 'on' when a cell is filled to 80%. With this, the dimensions of a single measuring cell are delineated: it should be square and one line of the reference pattern alone should fill it to between 50 or 60% of its surface area. These conditions require that the cells grow in the same proportion as the reference pattern is enlarged to fit the imprint.

The translation of a line pattern into a field pattern of optical densities follows the growth of a fingerprint to give always the same characteristic string of digits by which it is recognized. The proportional enlargement of the ridge patterns during the period of growth is normalized by the enlargement of the reference pattern to fit the inter-ridge distances.

One important feature of the present method derives from the fact that the information is collected from single fingerprints. Therefore, the imprint of a single digit found can be compared with any other one on file. This will facilitate considerably the search for a match in a majority of investigations, in all cases where only one or a few prints are available for identification. Neither the analysis nor the application of moiré interferometry requires knowledge whether a digital imprint came from the right or the left hand, information necessary to arrive at the composite formula currently used.

All components of the apparatus required to apply the interferometric method are currently available and in use. In the simplest of a number of apparative configurations (FIG. 5), the fingerprint and the reference pattern are projected separately on a ground-glass screen. The focal length and position of the projector showing the reference pattern are gradually adjusted until it matches the projected print and the correct interferogram is produced. The light intensity levels of the two projecting devices are equalized with a set of neutral density filters, or, by adjusting the lamps' relative input currents. A 'flying spot' scanner located behind the screen advances in controlled horizontal and vertical increments over the interferogram. A video converter expresses the measured signal intensities in binary code, or collects progressive signal intensities between extreme light levels and reduces them to an appropriate set of digits. The information is transmitted through an interface to a microcomputer for further processing, in particular, (a) to define the fingerprint area,
(b) to store the information collected, and
(c) to output the information in a particular retrieval format, e.g. for rapid telephone transmission.

The projectors for the imprint and the reference pattern can be replaced by any convenient means of superposition permitting a relative size adjustment.

The camera control is set to provide the end-to-end horizontal line scan. The focal length of the zoom lens in the video camera is adjusted to that of the zoom lens in the reference projector in such a way that the dimensions of a cell scanned on the screen relate to the line width of the reference pattern as is required. The entire field scanned extends, for instance, over a distance of 100 cells each in the horizontal and in the vertical direction from the center of the reference pattern. The optical matching is done by hand, or by mechanical or electronic coupling, according to the projection method available in the completed system.

Expressed in digital form, the information contained in a fingerprint is transmitted easily, rapidly, and inexpensively in a variety of ways. This brings out the additional advantage that the field pattern of optical densities resulting from the analysis described can be reconstructed in remote locations, without any loss of information. The digitized moiré interferograms of any of an individual's single fingerprints, or of a combination of several prints, could be kept on file, for instance, at a data bank to be addressed, and are supplemented by a qualifying act when access is requested. The qualifying code could be any selected string, or strings, of digits, from any single print or from a combination thereof. Alternatively, any coordinate of any print on file can be remotely addressed and its content questioned for confirmation. Such an access control system would enjoy a very high degree of confidence because of the individuality and the inherent flexibility of the code.

The string of bits in binary code coming from a matrix of $100 \times 100$ cells in the field seen expresses the individuality of a fingerprint in a most reliable fashion: the probability of finding an interferogram to match is given by the product of the probabilities of finding the correct match in each of the 10,000 cells and is, at 1 out of $2\exp[10,000]$ cases, extremely small. Therefore, one could admit a certain number of errors (for incomplete inking of the print, etc.) without losing the advantage of great reliability, or, one could scan a smaller field. Modern cameras scan a matrix of $100 \times 100$ cells easily in less than 1 second.

Although the invention has been described above in relation to fingerprints, it will be evident to the person skilled in the art that it may be refined and modified in various ways. It is therefore wished to have it understood that the present invention should not be limited in interpretation except by the terms of the following claims.

The embodiments of the invention which an exclusive property or priviledge is claimed are defined as follows:

1. A method of analysis of a line pattern comprising the steps of:
   superimposing a centrosymmetric reference pattern of lines over the line pattern to be analysed to form an interferometric pattern of the moiré type;
   positioning said reference pattern on a characteristic element of said line pattern to be analysed by gradually enlarging the reference pattern until the lines thereof fill the space between adjacent lines closest to said characteristic element to thereby translate said superimposed line patterns into a field pattern of different optical densities; and
   electronically measuring said optical densities.

2. A method as defined in claim 1, further comprising: storing data pertaining to said measurement.

3. A method as defined in claim 1 wherein the lines of said centrosymmetric reference pattern are circular.

4. A method as defined in claim 1 wherein the lines of said centrosymmetric reference pattern are circular and displayed on a transparent screen.

5. A method as defined in claim 1 wherein the lines forming the centrosymmetric reference pattern have the same periodicity throughout and are of equal thickness.

6. A method of automated analysis of a line pattern comprising the steps of:

superimposing a centrosymmetric reference pattern of lines over said line pattern to be analysed to form an interferometric pattern of the moiré type;

positioning said reference pattern on a characteristic element of said line pattern to be analysed;

adjusting said reference pattern by gradually enlarging said reference pattern until the lines thereof fill the space between adjacent lines closest to said characteristic element whereby said superimposed line patterns are translated into a field pattern of different optical densities;

scanning and measuring electronically said optical densities;

storing data obtained from said scanning and measuring.

7. A method as defined in claim 6, wherein an opto-electronic transducer is used to scan the superimposed patterns and to measure the optical densities over an electronically defined orthogonal grid.

8. A method as defined in claim 7, further comprising: adjusting said grid with said reference pattern; the adjusting steps for said reference pattern and said grid consisting in gradually enlarging said reference pattern and said grid.

9. A method as defined in claim 7, wherein said grid is formed of a predetermined number of cells; comprising the step of digitizing the optical density scanned by each cell and storing the digits in the sequence encountered by the transducer.

10. An apparatus for analysing a line pattern comprising:

a centrosymmetric reference pattern of lines adapted to be superimposed over a line pattern to be analysed to form an interferometric pattern of the moiré type;

means for adjusting said reference pattern relative to said pattern to be analysed including means for gradually enlarging said reference pattern until the lines of said reference pattern fill the space between adjacent lines closest to a characteristic element on said line pattern to be analysed to thereby translate said superimposed line patterns into a field pattern of different optical densities;

means for electronically scanning and measuring said optical densities.

11. An apparatus as defined in claim 10, further comprising means for storing data obtained from said scanning and measuring means.

12. An apparatus as defined in claim 10, wherein the lines of said reference pattern are circular and of equal thickness, and have the same periodicity throughout.

13. An apparatus as defined in claim 10, wherein said centrosymmetric reference pattern is part of a transparent screen.

14. An apparatus as defined in claim 10, wherein said scanning and measuring means include an opto-electronic transducer and an orthogonal grid containing unit cells.

15. An apparatus as defined in claim 14, wherein said means for adjusting said reference pattern further includes means for simultaneously enlarging said grid.

16. An apparatus as defined in claim 14, wherein said scanning and measuring means include means for digitizing the optical density measured in each cell; means for storing the digits in the sequence encountered by the scanning and measuring means.

17. An apparatus as defined in claim 10, comprising first projector means for projecting on a transparent screen a fingerprint and said reference pattern; means for adjusting gradually the focal length of a second projector means, and means for equalizing the intensity levels of said first and second projector means; said scanning and measuring means consisting of a flying spot scanner located behind said screen; means for advancing said scanner in pre-set horizontal and vertical increments over the superimposed patterns.

18. An apparatus as defined in claim 17, comprising a micro-computer and means to process information from said scanner to said micro-computer for storing said information.

* * * * *